A. PORTER & J. A. CLARK.

Loom-Temple.

No. 8,656. Reissued April 1, 1879.

Witnesses.
G. F. Connor.
N. E. Whitney

Inventors
Alfred Porter,
John A. Clark,
by Crosby & Gregory,
Attys

UNITED STATES PATENT OFFICE.

ALFRED PORTER AND JOHN A. CLARK, OF MANCHESTER, N. H.

IMPROVEMENT IN LOOM-TEMPLES.

Specification forming part of Letters Patent No. 188,538, dated March 20, 1877; Reissue No. 8,656, dated April 1, 1879; application filed December 14, 1878.

*To all whom it may concern:*

Be it known that we, ALFRED PORTER and JOHN A. CLARK, both of the city of Manchester, county of Hillsborough, and State of New Hampshire, have invented certain new and useful Improvements in Temples for Looms; and we do hereby declare that the following is a full, clear, and exact description of the same, reference being had to the accompanying drawings, forming a part of this specification, and in which—

Figure 1:
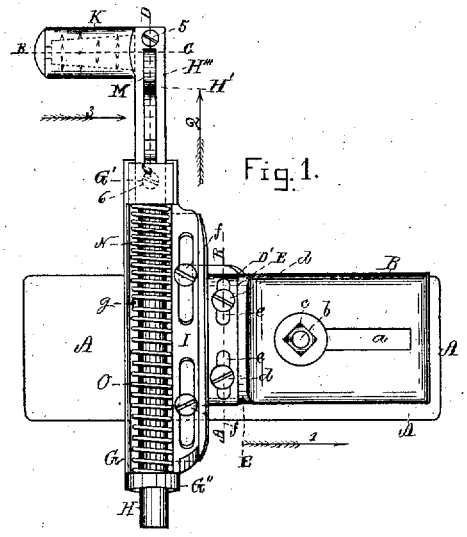
Figure 2:
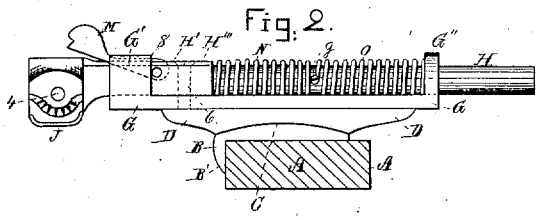
Figure 3:
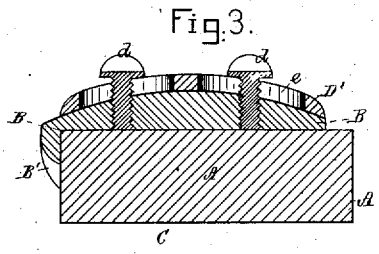
Figure 4:
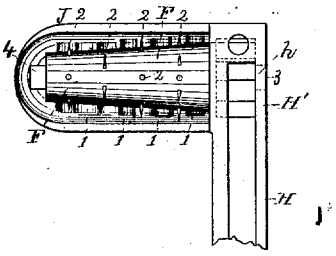
Figure 5:
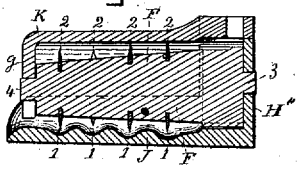
Figure 6:
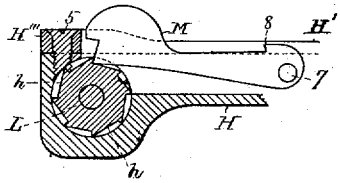

Figure 1 represents a top or plan view of our improved temple. Fig. 2 represents a side view, looking in direction of arrow 3, Fig. 1. Fig. 3 represents, upon an enlarged scale, a section on line A B, Fig. 1, looking in direction indicated by arrow 1 of the same figure. Fig. 4 represents, also upon an enlarged scale, a top or plan view of the lower jaw and burr or temple-roll of our improved temple, the upper jaw or cap being removed to show the other parts more fully. Fig. 5 represents, also upon an enlarged scale, a central longitudinal section through the jaws and burr-roll of the temple on line B C, Fig. 1, looking in direction indicated by arrow 2 of the same figure; and Fig. 6 represents, also on an enlarged scale, a section taken on line C D, Fig. 1, looking in direction of arrow 3 of the same figure.

To enable those skilled in the art to which our invention belongs to make and use the same, we will proceed to describe our said invention more in detail.

In the drawings, the part marked A represents a section of the front or breast beam of the loom, over which the cloth passes as it is woven, and upon each end of said beam is arranged a metallic piece or plate, B, provided with a slot, *a*, whereby, by means of the bolt *b* and nut *c*, said metal piece can be set nearer to or farther from the outer end of the breast-beam A, according to the width of the cloth.

Metal piece B is provided with a flange, B′, to fit against one edge of the breast-beam A, as indicated in Figs. 2 and 3, to assist in keeping the said piece squarely on the beam, and by the use of but one set-screw. The said piece is also provided with a circular or curved rest or seat, C, to receive the temple-holder D, the rear part, D′, of which fits against a flange, E, upon the metal part B, and to which part temple-holder D is secured by means of the screw-bolts *d d*, which pass through slots *e e* in the part D′, and screw into the part B, as indicated in Figs. 1 and 3. By these arrangements the temples at each edge of the web can be adjusted toward or from each other, and they can also be rocked back and forth or adjusted on curved seats C C, and be then secured in position, so as to cause the ends of the temple rods or bars carrying burr-rolls F to occupy a higher or lower position vertically with relation to the breast-beam, and the usual reed and lay in advance of it, according to the proportions of the loom, as may be desired.

The part marked G is the temple-frame, in which the temple-rod H is fitted to slide back and forth. The front part, H′, is made in rectangular shape, to fit a rectangular hole in the guide-loop or bearing part G′, while the rear end of the temple rod or stem H is made round, to pass through a corresponding hole in the loop or guide part G″ of frame G. By this mode of construction the temple rod or stem H can move back and forth in its guides or loop-bearings G′ G″, and the former bearing, being rectangular, retains the stem in its proper relative position, and obviates all rotatory motion.

Frame G is fastened to the part D by means of screw-bolts *f f*, passing through slots in the projecting part I of frame G, and by means of which slots and screw-bolts the temple can be set forward or back, as occasion may require.

Projecting laterally from the inside of the rectangular end of stem or temple-rod H is a concave jaw, J, provided with a series of parallel grooves, 1, in which the rows of teeth 2 of the conical burr-roll F enter as said roll revolves. The journals 3 4 of burr-roll F are supported, the former in the part H″ of the temple rod or stem H, and the latter in the downwardly-projecting portion *g* of the cap or upper jaw, K. Said upper cap or jaw, in this instance, forms a part of the slotted piece H‴, which is secured to and forms a part of the rectangular end of temple rod or stem H, said slotted part H‴ being secured to the other part of temple-rod H by means of screws 5 and 6, the latter being shown by dotted lines in Fig. 1.

The base of burr-roll F is formed with a ratchet-wheel part, L. A slot or hole is formed in the side of the rectangular part H′, to receive the ratchet-wheel part L of the burr-wheel F.

A pawl, M, is pivoted at 7 in a slot in the rectangular part H′, to take into the ratchet-teeth *h* of the ratchet-wheel L, as fully indicated in Fig. 6 of the drawings. The base of pawl M is provided with a ratchet-tooth, 8. (See Fig. 6.)

From the foregoing description it will be seen that the selvages of the cloth will be drawn a little more taut than the cloth at the inner points of the burr-wheels; consequently the edges of the web of cloth, as it is woven, are not allowed to be loose and slack, thereby causing imperfect selvages. Then, again, by the action of pawl M, the burr-rolls F cannot turn back, but are held in place as the cloth is woven sufficiently to pass one tooth, *h*, and these teeth may be made finer or coarser, as preferred.

Upon the temple rod or stem H are arranged two spiral springs, N and O, a pin, *g*, being inserted between their inner ends in the rod H.

The outer end of spring N presses against the shoulder of the rectangular part H′ of rod H, while the outer end of spring O presses against the loop-guide G″ of the part G.

By this arrangement of said springs the temple rod or stem H will be so operated upon and held as to rest in the position shown in Fig. 1; but when pressure is applied to its front end, spring O will contract and allow the rod, with its temple, to move back; but as soon as said force is removed the action of spring O will force the rod or stem back to its normal position.

Then, again, when force is applied in the opposite direction, spring N will contract, and allow the rod and the temple to move forward; but the action of spring N, as soon as the force ceases to act, will throw the rod back to its normal position again.

We have, therefore, produced a temple centrally supported, but capable of moving forward or back during the operation of weaving by means of a spring action, and consequently the strain on the cloth and warp-threads is quite even and easy, and not such as to tend to either tear the cloth or break the threads.

If preferred, pin *g* may be made adjustable, so as to enable the operator to adjust the tension of one or both of said springs.

By making the concavity of the lower jaw or part, J, with a series of grooves, 1, in which the burr-teeth 2 enter as they revolve, the cloth is retained upon said teeth, and is not liable to slip off, and consequently the cloth is always retained in a uniform and perfect manner.

It sometimes happens in mending threads, or in "picking out," that it is convenient to have the jaws or parts J K held back.

For this purpose pawl M is provided with a catch, 8, so that by simply pushing temple-rod H back, as shown in Fig. 2, and raising pawl M, so that its catch 8 will strike against the rear edge of guide-loop G′, the parts will be retained in position, as shown in Fig. 2, until the attendant forces the pawl M down, when spring O will force the parts forward, as shown in Fig. 1.

We claim—

1. The temple-frame, its roller, and roller-carrying bar or rod, combined with a laterally-adjustable plate, to rest upon the breast-beam, and with mechanism to support and adjust the temple-roller carried by the said bar in the frame vertically with reference to the surface of the plate and breast-beam, substantially as described.

2. The temple-frame, its roller, and roller-carrying bar or rod, combined with a laterally-adjustable plate provided with a flange or projection to embrace the front of the breast-beam, and with mechanism to support and adjust the temple-roller carried by the said bar in the frame vertically with reference to the surface of the plate and breast-beam, substantially as described.

3. The temple-frame, its roller, and roller-carrying bar or rod, combined with a laterally-adjustable plate adapted to rest upon the breast-beam, and with mechanism to support and adjust the temple-roller carried by the said bar in the frame vertically with reference to the surface of the said plate and breast-beam, and with devices to adjust the temple-frame horizontally or substantially at right angles to the rear face of the breast-beam, substantially as described.

4. The plate B, fitted to the surface of the breast-beam, and provided with a flange, E, in combination with the temple-frame, the temple-bar, the temple-roller, and devices to hold and adjust the temple-roller and its carrying bar and frame vertically with relation to the breast-beam, the said flange E operating to maintain the temple-frame and roller-carrying bar always in the proper line with relation to the rear face of the breast-beam.

5. The combination of the curved temple-supporting piece D, with the curved seat B, and one or more holding and adjusting screws, *d*, substantially as and for the purposes set forth.

6. The combination of the curved temple-supporting piece B of the curved seat D, the frame G, and the temple-rod H, substantially as shown and described.

7. The combination, with the temple-rod H and its frame G, of the springs N and O and pin *g*, substantially as and for the purposes set forth.

ALFRED PORTER.
JOHN A. CLARK.

Witnesses:
MOSES FELLOWS,
F. J. DUTCHER.